(12) United States Patent
Bregoli et al.

(10) Patent No.: US 12,446,218 B2
(45) Date of Patent: Oct. 14, 2025

(54) MEMORY CELL WITH CONTIGUOUS P-WELL AND N-WELL STRUCTURES

(71) Applicant: STMicroelectronics S.r.l., Agrate Brianza (IT)

(72) Inventors: Roberto Bregoli, Offlaga (IT); Alessandro Ferretti, Villanuova Sul Clisi (IT); Federica Rosa, Corsico (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 276 days.

(21) Appl. No.: 18/185,575

(22) Filed: Mar. 17, 2023

(65) Prior Publication Data

US 2023/0328979 A1 Oct. 12, 2023

(30) Foreign Application Priority Data

Mar. 28, 2022 (IT) .................. 102022000006035

(51) Int. Cl.
| | |
|---|---|
| *G11C 16/04* | (2006.01) |
| *G11C 16/10* | (2006.01) |
| *G11C 16/14* | (2006.01) |
| *H10B 41/35* | (2023.01) |
| *H10B 41/70* | (2023.01) |

(52) U.S. Cl.
CPC ........... *H10B 41/70* (2023.02); *G11C 16/045* (2013.01); *G11C 16/10* (2013.01); *G11C 16/14* (2013.01); *H10B 41/35* (2023.02)

(58) Field of Classification Search
CPC ....... G11C 16/14; G11C 16/10; G11C 16/045; H10B 41/70; H10B 41/35

USPC ........................................................ 365/185.1
See application file for complete search history.

(56) References Cited

U.S. PATENT DOCUMENTS

| | | | |
|---|---|---|---|
| 5,475,335 A * | 12/1995 | Merrill ................. | H10D 84/859 |
| | | | 257/376 |
| 5,596,524 A * | 1/1997 | Lin ........................ | H10B 69/00 |
| | | | 257/315 |
| 6,512,700 B1 | 1/2003 | McPartland et al. | |
| 7,212,446 B2 * | 5/2007 | Diorio ................. | G11C 16/3468 |
| | | | 365/185.21 |
| 2004/0195593 A1* | 10/2004 | Diorio ................. | G11C 16/3404 |
| | | | 257/202 |
| 2005/0030827 A1* | 2/2005 | Gilliland ............. | G11C 16/3468 |
| | | | 365/232 |

(Continued)

*Primary Examiner* — Sung Il Cho
(74) *Attorney, Agent, or Firm* — Slater Matsil, LLP

(57) ABSTRACT

A non-volatile memory cell includes a first well of a first conductivity type and a second well of a second conductivity type in a body adjacent to each other; a first conduction region, a second conduction region and a third conduction region in the first well, the first, second and third conduction regions being of the second conductivity type; a control gate region, of the first or second conductivity type, in the second well; a selection gate over the first well forming, together with the first and second conduction regions, a selection transistor; and a floating gate region. The floating gate region has a programming portion overlying the first well and a capacitive portion overlying the second well. The floating gate region forms, together with the second and third conduction regions, a storage transistor and, together with the control gate region, a capacitive element.

20 Claims, 10 Drawing Sheets

(56) References Cited

U.S. PATENT DOCUMENTS

| | | |
|---|---|---|
| 2005/0052926 A1* | 3/2005 | Agata ................ G11C 16/0425 365/222 |
| 2011/0157972 A1 | 6/2011 | Pasotti et al. |
| 2011/0157977 A1 | 6/2011 | Pasotti et al. |
| 2015/0221371 A1 | 8/2015 | Milani et al. |

* cited by examiner

MEMORY CELL WITH CONTIGUOUS P-WELL AND N-WELL STRUCTURES

CROSS-REFERENCE TO RELATED APPLICATIONS

This application claims the benefit of Italian Patent Application No. 102022000006035, filed on Mar. 28, 2022, which application is hereby incorporated herein by reference.

TECHNICAL FIELD

The present invention relates generally to an electronic memory and more specifically to a non-volatile memory cell.

BACKGROUND

As is known, a non-volatile memory device comprises an array of memory cells configured to store different quantities of electric charges in the floating gate so as to set different levels of the threshold voltage and thus store different logic values.

Generally, in this type of memory devices, the operation of injecting electric charges into the floating gate region is called "programming" and the operation of extracting electric charges is called "erasing".

Among non-volatile memories, MTP (Multi-Time Programmable) and FTP (Few-Time Programmable) memories are getting more and more interest, since they may be manufactured using standard CMOS processes.

In FTP and MTP memory devices, each memory cell has a floating gate region that is capacitively coupled with an implanted control region and is formed in a same polysilicon layer as the control gate region of selection transistors.

Thereby, manufacture of the FTP memory devices is highly simplified and FTP and MTP memory devices are advantageously usable in applications where modification of the stored logic levels is relatively seldom compared with reading.

U.S. Patent Application No. 2011/0157977 discloses an FTP memory device, which is both programmed and erased using the Fowler-Nordheim effect.

Here, each cell comprises a first and a second well, both of P− conductivity type, isolated from each other by an isolating wall. The first well accommodates a selection transistor and a storage transistor, coupled in series. The storage transistor has a floating gate capacitively coupled to a control gate region formed in the second well.

The circuitry comprises suitably isolated driver transistors able to withstand the high programming and erasing voltages.

Thereby, low programming current are used, power consumption is low, the control circuitry is simplified and the memory device is efficient.

Although representing a considerable improvement with respect to previous FTP memory devices, the solution taught in U.S. Patent Application No. 2011/0157977 may still be improved as regards the area occupied by the memory cells.

SUMMARY

According to embodiments of the present invention, a non-volatile memory cell, a non-volatile memory array and a method are described herein.

BRIEF DESCRIPTION OF THE DRAWINGS

For the understanding of the present invention, embodiments thereof are now described, purely as a non-limitative example, with reference to the enclosed drawings, wherein:

FIG. 1 shows a non-volatile memory device 100 of a MTP (Multi-Time Programmable) type, with a single-poly floating gate.

DETAILED DESCRIPTION OF ILLUSTRATIVE EMBODIMENTS

Some embodiments of the present invention are directed to NV memories of the single poly type. Some embodiment memory cells advantageously have smaller dimensions than conventional memory NV cells. Since the array area takes a big share of the total area (70-80%) of a memory, any improvement in the cell area advantageously results in a dramatic improvement in the efficiency of the memory devices.

Some embodiments are directed to a single poly, floating gate, Multi-Time Programmable (MTP) non-volatile (NV) memory device with reduced dimensions and to biasing method thereof.

Figure 2:
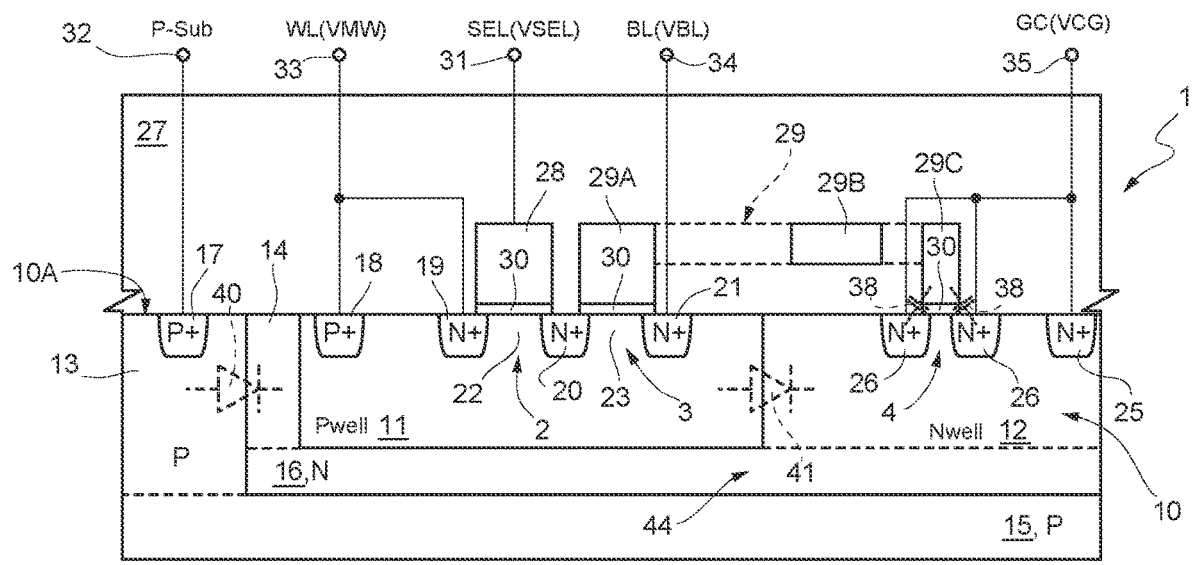
FIG. 2 is a simplified cross-section of an embodiment of a memory cell of the non-volatile memory device of FIG. 1, taken along section line II-II of FIG. 3.
Figure 9:
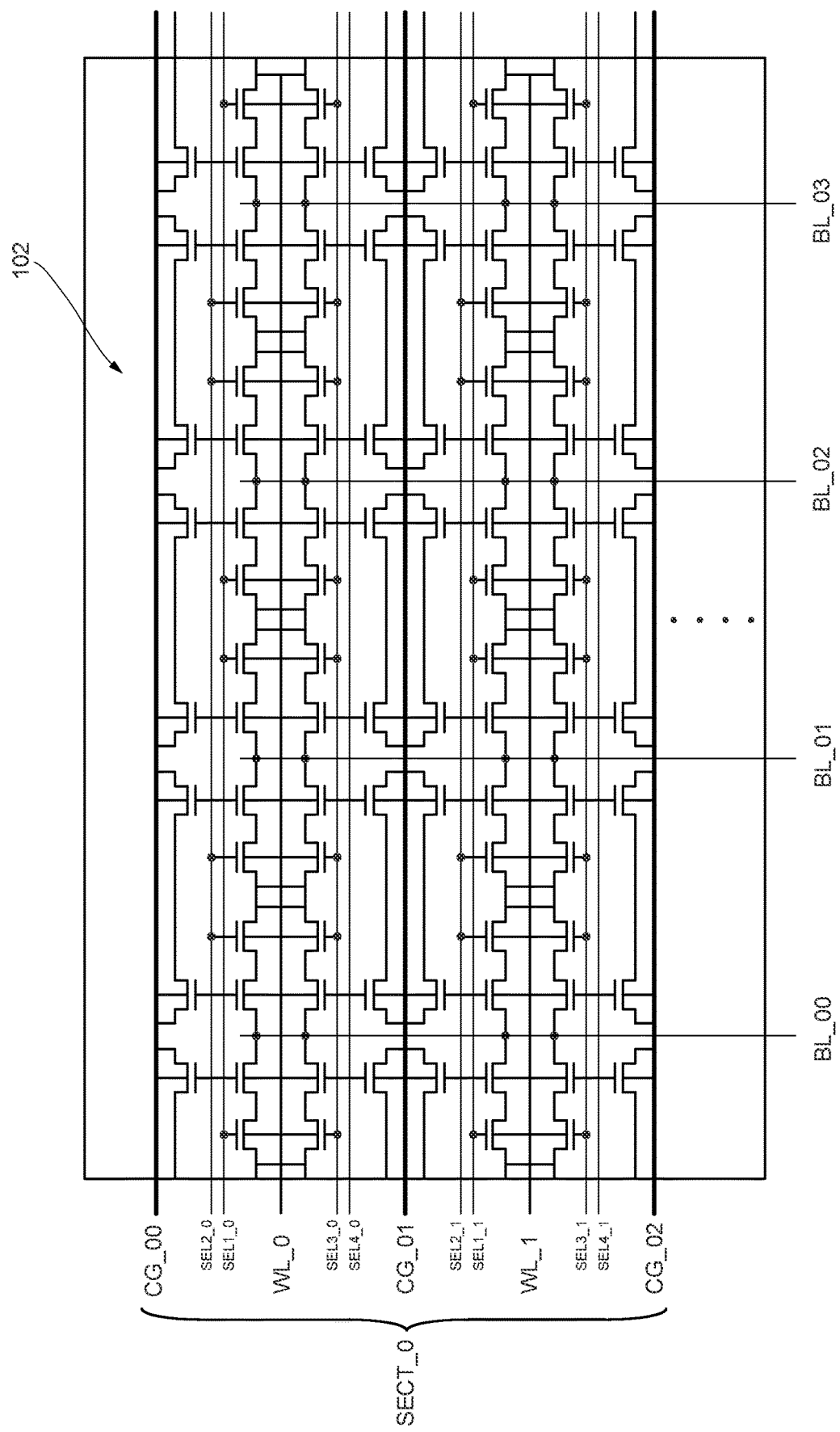
FIG. 9 shows the architecture of a sector of the memory array of FIG. 1.
Figure 11:
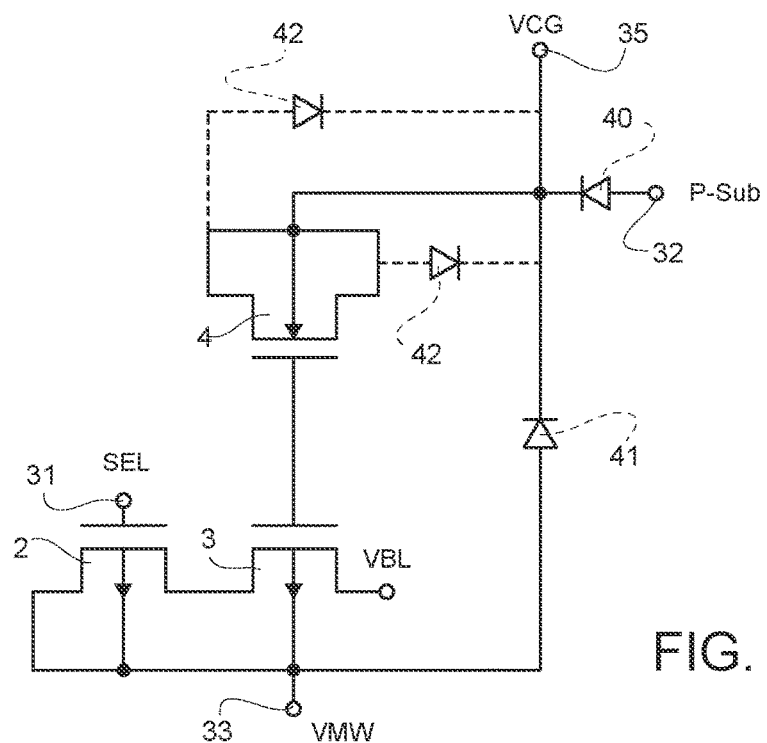
FIG. 11 shows an electric equivalent of the memory cell of FIG. 10.

The non-volatile memory device 100 includes a memory array 105, formed by a plurality of memory cells 1, 201, (embodiments whereof are shown in FIGS. 2, 9 and 11) organized in rows and columns and storing each a logic value (for example, one bit).

As described below, each memory cell 1, 201 is based on a floating gate MOS transistor that has a threshold voltage that depends on electric charge stored in its floating gate. Different levels of the threshold voltages represent different logic values; here, non-volatile memory device 100 is of single bit type, where the memory cells 1, 201 are programmed (conventionally, at a logic value "0", using flash convention logic value, and at logic value "1", using E²PROM convention) when they have a high threshold voltage, and are erased (conventionally, at a logic value "1", using flash convention logic value, and at logic value "0", using E²PROM convention) when they have a low threshold voltage.

As also described in detail hereinafter with reference to FIGS. 2-13, each memory cell 1, 201 may be read and programmed individually and the memory device 100 may simultaneously read or program selected cells of the memory array 105 (for example, 8, 16 or 32 memory cells 1, 201).

Figure 1:
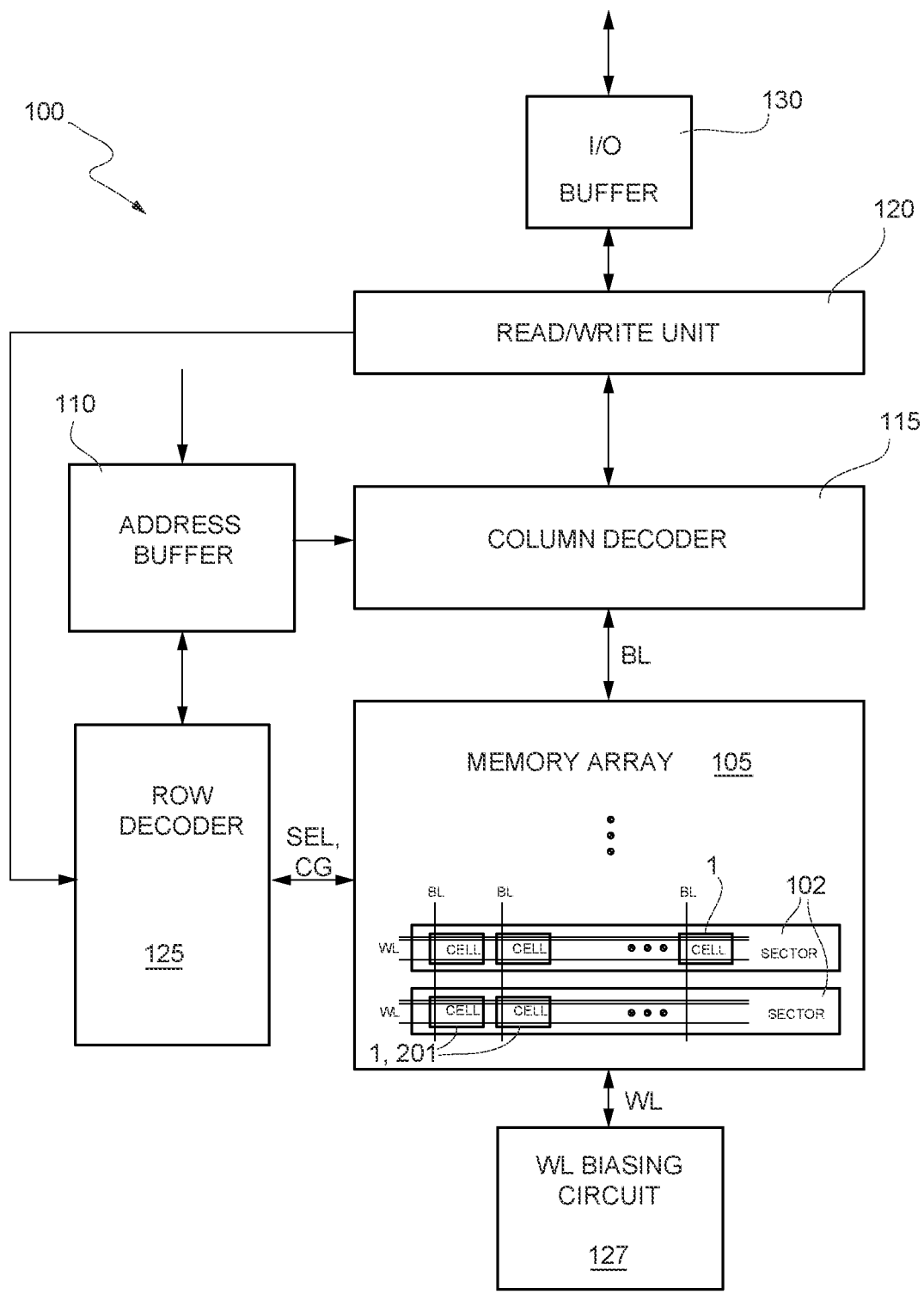
FIG. 1 is a schematic block diagram of a non-volatile memory device.

Conversely, memory cells 1, 201 are erased in groups called sectors, identified by number 102 in FIG. 1; for example, each sector 102 comprises a plurality of rows of memory cells 1, 201.

To allow reading, programming and erasing, the memory cells 1, 201 are coupled to a column decoder 115 through bitlines BL and to a row decoder 125 through selection lines SEL and control gate lines CG. Word lines WL are also coupled to memory cells 1, 201. In particular, FIG. 1 shows a word line biasing circuit 127, generating appropriate voltages for word lines WL. Word line biasing circuit 127 operates under control of a control unit or an external unit, not shown, as discussed in more detail hereinafter.

An address buffer 110 receives, from the control unit or external unit, not shown, an address of a page in the memory array 105 (selected page) and selects the desired row(s) through the control gate lines CG and the desired column(s) in the memory array 105 through the bitlines BL.

The address buffer 110 may be also used to select a sector 102 that is to be erased (through the row decoder 125, as explained hereinbelow).

A read/write unit 120 controls operation of the row decoder 125 and of the column decoder 115. The read/write unit 120 also includes some components (such as a power management unit with charge pumps, sense amplifiers, comparators, reference cells, pulse generators, and so on) that are used for writing (i.e., programming or erasing) the memory cells 1, 201 and for reading their logic values, in a per se known manner. The read/write unit 120 is coupled with an input/output (I/O) buffer 130; the input/output buffer 130 receives a word to be written into the selected page of the memory array 105, or outputs a word that has been read from the selected page of the memory array 105 (through the column decoder 115).

Figure 3:
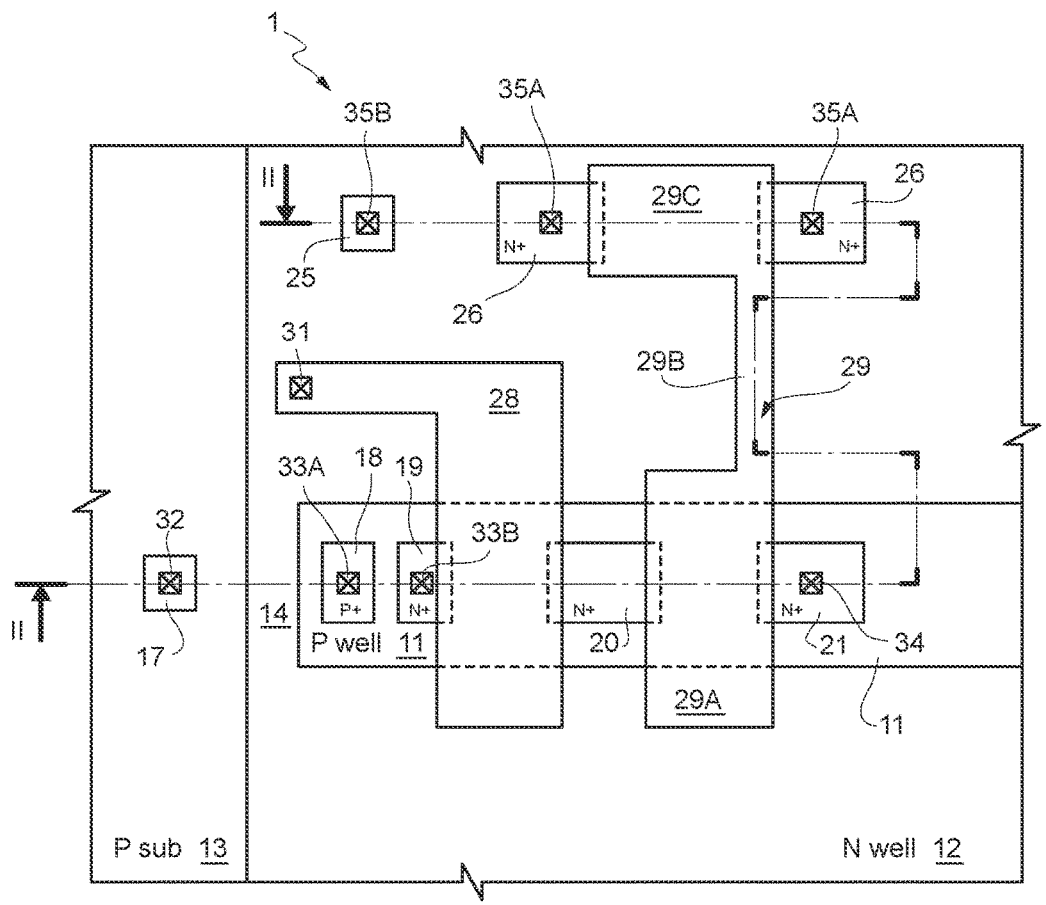
FIG. 3 shows the layout of the memory cell of FIG. 2.
Figure 4:
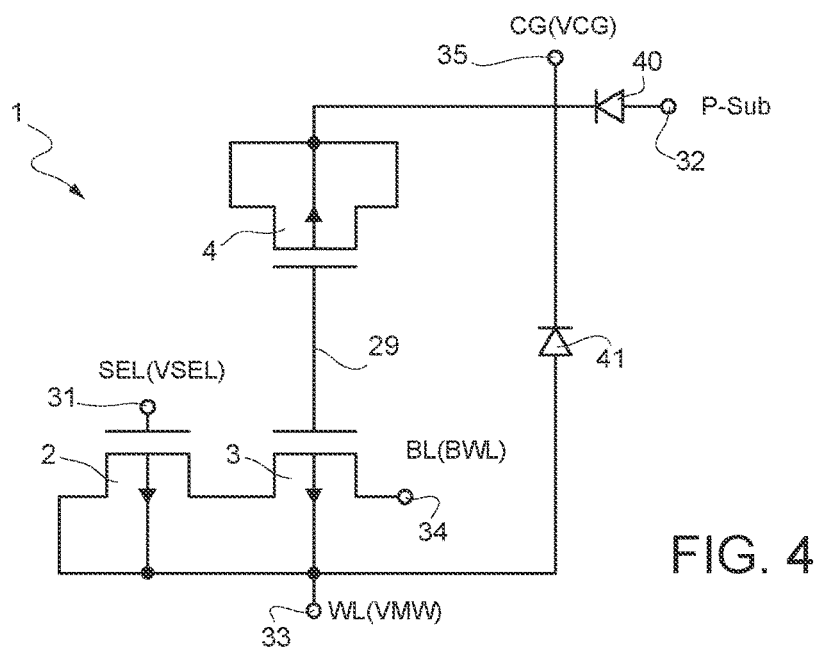
FIG. 4 shows an electric equivalent of the memory cell of FIGS. 2 and 3.

FIGS. 2-4 show an embodiment of a memory cell 1.

Memory cell 1 is formed in a body 10 and comprises a selection transistor 2, a storage transistor 3, and a capacitor transistor 4, all MOS type.

Selection transistor 2 and storage transistor 3 are formed in a same well of body 10 (first well 11, forming a memory cell well, here of P-type); capacitor transistor 4 is formed in a separate well of body 10 (second well 12, forming a control gate well, here of N-type). First and second wells 11, 12 are high-voltage wells; thus, they are designed to be able to correctly operate at high operational voltages, as for example as used during programming and erasing.

In FIGS. 2-4, selection transistor 2 and storage transistor 3 are thus NMOS transistors and capacitor transistor 4 operates as a capacitor, as described hereinafter.

In detail, body 10 has a surface 10A and comprises a substrate 15, here of P type; a bottom isolation layer 16, here of N type, overlying the substrate 15 except at an area where the substrate 15 is in direct electrical contact with a substrate well 13; the first well 11, overlying the bottom isolation layer 16; and the second well 12, overlying the bottom isolation layer 16.

First well 11 and second well 12 are adjacent and contiguous.

Substrate well 13 is of P-type and may have the same or a different doping level as substrate 15; therefore, the interface between the substrate 10 and the substrate well 13 is indicated by a dash line.

A substrate contact region 17, of P+ conductivity type, extends from the surface 10A of the body 10 to the interior of substrate well 13.

Second well 12 surrounds the first well 11, as visible from FIG. 3, and forms a well isolating wall 14, of N type, extending laterally between the substrate well 13 and the first well 11 and vertically between the bottom isolation layer 16 and the surface 10A of substrate 10.

Well isolating wall 14 may be connected with second well 12, to form, together with bottom isolation layer 16, an N-well structure 44 that surrounds the first well 11 laterally, as visible in FIG. 3, and on the bottom, as visible in FIG. 2.

Each first well 11 accommodates a first well contact region 18; a first conduction region 19; a second conduction region 20; and a third conduction region 21. Here, first well contact region is of P+ type and conduction regions 19-21 are of N+ type.

First well contact region 18 and conduction regions 19-21 extend from the surface 10A of the body 10 to the interior of first well 11. First and second conduction regions 19, 20 of each memory cell 1 are spaced apart to define a first channel portion 22 between them; second and third conduction regions 20, 21 of each memory cell 1 are spaced apart to define a second channel portion 23 between them.

Second well 12 accommodates a second well contact region 25, here of N+ type, and two control gate regions 26, here also of N+ type. Control gate regions 26 are functionally the same and could be replaced by a single control gate region, for example, wider, obtained using appropriate manufacturing steps for implanting a capacitive portion between the control gate regions 26, or other similar techniques.

Second well contact region 25 and control gate regions 26 extend from the surface 10A of the body 10 to the interior of second well 12.

An insulating layer 27 extends on the surface 10A of the body 10 and embeds a selection gate region 28 and a floating gate region 29. Gate regions 28, 29 are of conductive material, in particular polysilicon, are insulated from the body 10 by gate oxide regions 30 (including any field oxide, not shown) and have the shape shown in FIG. 3.

Field oxide regions (not shown) extend on the surface 10A of the body, and delimit active areas, in a known manner.

Selection gate region 28 extends over the first channel portion 22.

Floating gate region 29 is a single connected region that is not directly coupled to any contact in the memory array and comprises a programming portion 29A, a connection portion 29B (visible only partially in FIG. 2) and a control gate portion 29C.

Programming portion 29A extends over the first well, directly above the second channel portion 23; control gate portion 29C extends over the second well 12, directly above the space between the control gate regions 26; connection portion 29B connects programming portion 29A and control gate portion 29C.

Vias extend through the insulating layer 27 for electrical connection of various regions in wells 11, 12 (as described later) as well as selection gate 28 and are represented in FIG. 2 by lines.

In particular, selection gate 28 is coupled, at a selection terminal 31, to a selection line SEL (receiving a selection voltage VSEL); substrate contact region 17 is coupled to a P-sub terminal 32 for supplying a substrate potential P-Sub; first well contact region 18 and first conduction region 19 are coupled together and to a first well terminal 33 to receive a first well biasing voltage VMW; third conduction region 21 is coupled to a drain terminal 34 for connection to a bitline BL (to receive a bitline voltage VBL); control gate regions 26 and second well contact region 25 are coupled together and to a second well terminal 35, to receive a control gate biasing voltage VCG.

The first conduction region 19, the second conduction region 20, the first channel portion 22 and selection gate region 28 form the selection transistor 2 (with first conduction region 19 operating here as a source and second conduction region 20 forming a drain); the second conduction region 20, the third conduction region 21, the second channel portion 23 and the programming portion 29A of the floating gate region 29 form the storage transistor 3 (with second conduction region 20 operating as a source and third conduction region 21 forming a drain); control gate regions 26 and control gate portion 29C form the capacitor transistor 4.

In practice, selection transistor 2 and storage transistor 3 are series-coupled and share second conduction region 20.

Because capacitor transistor 4 has control gate regions 26 of the same conductivity type (N) as the second well 12, it has short-circuited source, drain and channel (bulk) portions and is not able to operate as a standard MOS transistor, but is equivalent to a capacitor, as represented schematically in FIG. 2 by capacitors 38.

In practice, the N-well structure 44 and the bottom isolation layer 16, together with regions 18-21, form a triple well structure.

In the structure of FIGS. 2-4, a first parasitic diode 40 is formed between the substrate well 13 (and substrate 15, both P-type) and the N-well structure 44, as shown in FIG. 2 by dash lines. In addition, a second parasitic diode 41 is formed between the first well 11 and the N-well structure 44, as also shown in FIG. 2 by dash lines.

FIG. 3 shows a possible layout of the memory cell 1 and in particular the shape of the floating gate region 29, with portions 29A-29C; wells 11, 12; substrate well 13; first well contact region 18; conduction regions 19-21; second well contact region 25; and control gate regions 26.

In addition, FIG. 3 shows also contacts to terminals 31-35, indicated by the same reference numeral of the respective terminals, except for contacts 33A, 33B to the first well contact region 18 and to the first conduction region 19, respectively, (which are coupled together by metal lines to form first well terminal 33 of FIGS. 2 and 4), and for contacts 35A and 35B to the control gate regions 26 and to the second well contact region 25, respectively (which are coupled together by metal lines to form second well terminal 35 of FIGS. 2 and 4).

As visible from FIG. 3, the area of control gate portion 29C of floating gate region 29 is smaller than the area of the programming portion 29A, so that, when the memory cell 1 is biased to be erased and programmed, the voltage drop between the second well 12 and the first well 11 mainly falls across capacitor transistor 4 (across capacitors 38). The first well 11 may be kept at low voltage (ground) and the second well 12 is always at a higher potential than the first well 11, at least for selected memory cells 1, as described in detail hereinbelow with reference to FIGS. 5A-5F, 6A-6F and 7A-7B. Therefore, parasitic diodes 40, 41 always reversed biased.

FIG. 4 shows the equivalent electric scheme of the memory cell 1 of FIG. 2, showing the series connection of selection transistor 2 and storage transistor 3, the capacitor connection of the capacitor transistor 4 and parasitic diodes 40, 41.

FIG. 4 also indicate the first well biasing voltage VMW at first well terminal 33; the control gate biasing voltage VCG at second well terminal 35, and the selection voltage VSEL, at selection terminal 31.

Memory cell 1 operates as discussed hereinbelow, making reference to FIGS. 5A-7B that use the schematic of FIG. 4 (neglecting the parasitic diodes 40, 41).

Reading

Figure 5A:
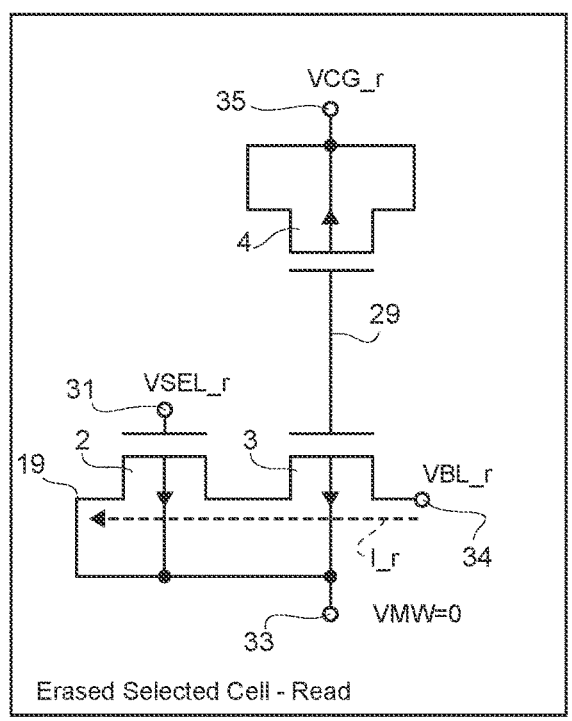
FIGS. 5A-5F show the electric equivalent of the memory cell of FIG. 2 during a read operation, depending on the memory cell state and its coupling to selected/non-selected biasing lines.

FIG. 5A shows a memory cell 1, selected for reading, that has been previously erased. Therefore, memory cell 1 has a low threshold voltage and stores a corresponding logic value (using flash convention logic value "1"; using $E^2$PROM convention, logic value "0").

Reading, as above indicated, is done individually, generally simultaneously with other memory cells 1 arranged on a same row of memory cells 1 (e.g., by reading some or all the memory cells 1 arranged in the same first well 11 and coupled to a same wordline WL in a sector 102 of FIG. 1).

In particular, for reading selected memory cell 1 of FIG. 5A, word line biasing circuit 127 (FIG. 1) biases the selected wordline WL (and thus the first well terminal 33) to low voltage, e.g., to ground (VMW=0 V, thereby grounding the first well contact region 18 and the first conduction region 19, FIG. 2). Row decoder 125 biases the selected selection line SEL (and thus selection terminal 31) to a selection read voltage VSEL_r (for example, VSEL_r=2.6 V).

The column decoder 115 (FIG. 1) biases the selected bitline BL (and thus drain contact 34) to a bitline read voltage VBL_r (for example, VBL_r=0.6 V).

In addition, row decoder 125 (FIG. 1) biases second well terminal 35 to a control gate read voltage VCG_r, for example VCG_r=5 V.

Although most of the control gate biasing voltage VCG_r falls across capacitors 38, they are able to bias floating gate 29 and thus the gate of storage transistor 3 (programming portion 29A) at a voltage suitable for reading.

In this condition, selection transistor 2 and storage transistor 3 of memory cell 1 are on. Since memory cell 1 of FIG. 5A is erased, a current I_r flows from the bitline BL (drain contact 34) toward first conduction region 19 and first well terminal 33, as shown in dashed line in FIG. 5A.

This current may be detected by the read/write unit 120 (FIG. 1) in a known manner.

Conversely (as not shown in the Figures), a memory cell 1 belonging to the selected sector (arranged in the same second well 12 and coupled to the same WL as selected memory cell 1 of FIG. 5A) and to an unselected bitline BL has applied thereto the same above indicated biasing voltages, except for at the bitline BL, that is kept low (for example, VBL=0 V). Therefore, no current flows in such a memory cell 1, independently from its programming level.

Figure 5B:
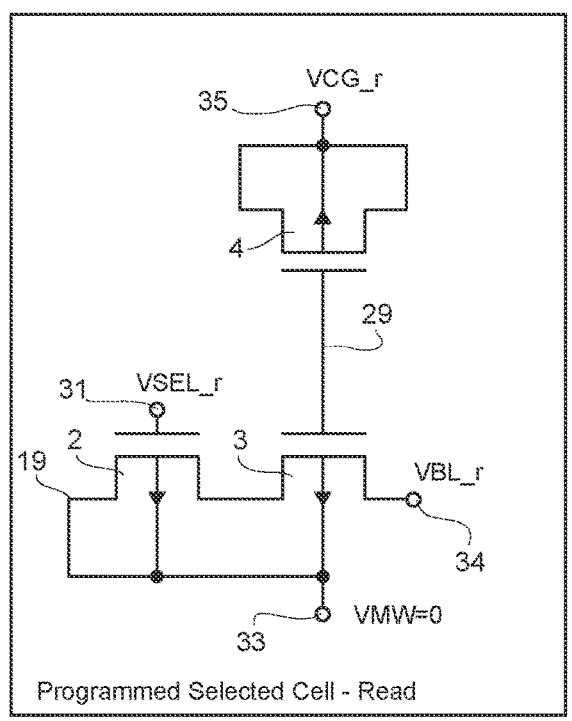

FIG. 5B shows the behavior of a memory cell 1, selected for reading, that has been previously programmed. Therefore, memory cell 1 has a high threshold voltage and stores a corresponding logic value (using flash convention, logic value "0"; using $E^2$PROM convention, logic value "1").

With the same biasing as in FIG. 5A, storage transistor 3 of memory cell 1 is off. Thus, no current flows through memory cell 1 and the absence of current may be detected by the read/write unit 120 (FIG. 1).

Figure 5C:
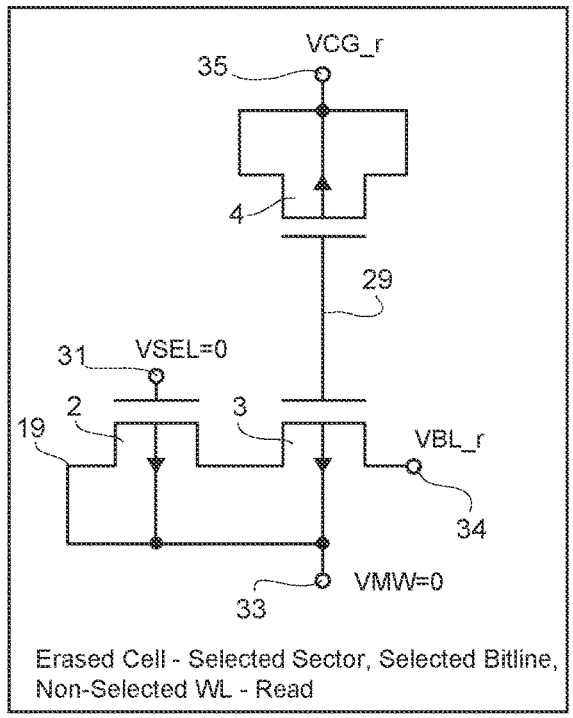

FIG. 5C shows the behavior of an erased memory cell 1 that is coupled to the same bitline as the selected memory cell 1 of FIG. 5A (selected bitline) but to a different wordline WL (non-selected wordline WL) in the same sector 102 (therefore, memory cell 1 of FIG. 5C shares the second well 12 with memory cell 1 of FIGS. 5A and 5B, but is arranged in a different first well 11).

In this case, VBL=VBL_r, VCG=VCG_r, but selection terminal 31 is at a low voltage, e.g., ground (VSEL=0V) and selection transistor 2 is off; thus, although storage transistor 3 is erased, no current flows through memory cell 1.

Figure 5D:
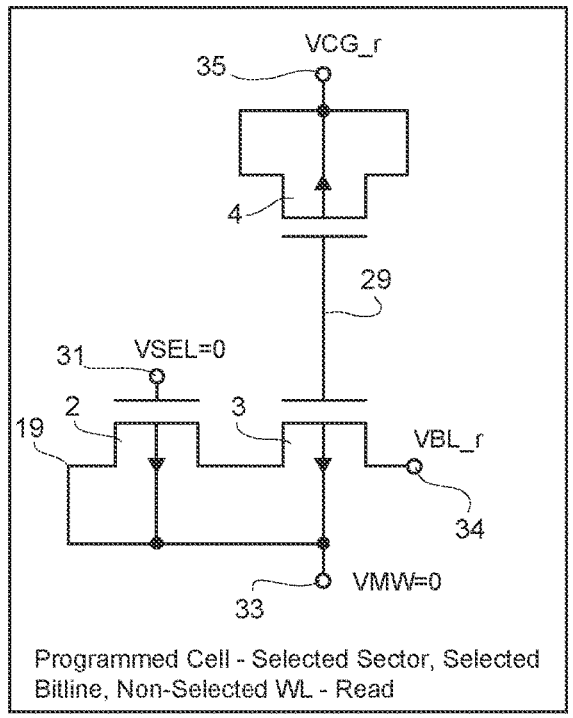

Analogously, FIG. 5D, in case of a programmed memory cell 1 that is coupled to the same bitline BL as the selected memory cell 1 of FIG. 5A but to a different wordline WL (non-selected wordline WL) in the same sector 102, both the selection transistor 2 and the storage transistor 3 are off and no current flows through memory cell 1.

Figure 5E:
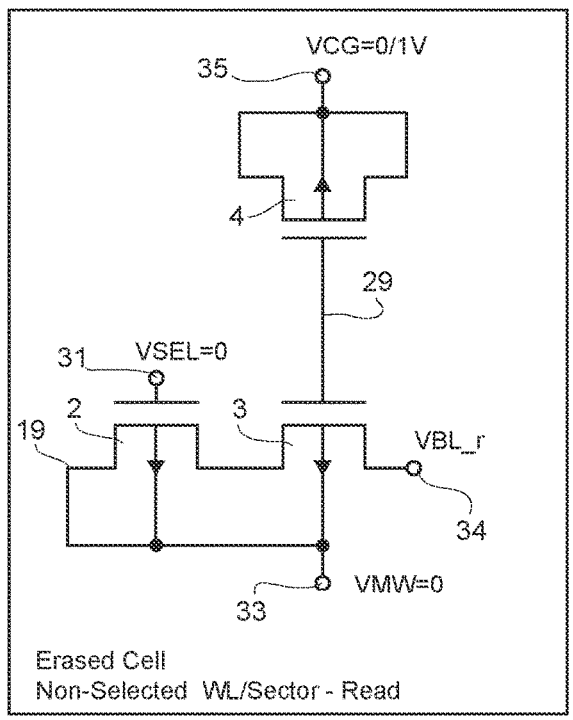

FIG. 5E shows the behavior of an erased memory cell 1 belonging to a non-selected sector 102 and coupled to selected bitline BL.

Here, second well terminal 35 is at low voltage (e.g., VCG=0-1 V), the first well terminal 33 is biased at low voltage, e.g., to ground (VMW=0 V), selection terminal 31 is grounded (VSEL=0V), thus selection transistor 2 is off. Thus, storage transistor 3 is off and no current flows through memory cell 1.

Figure 5F:
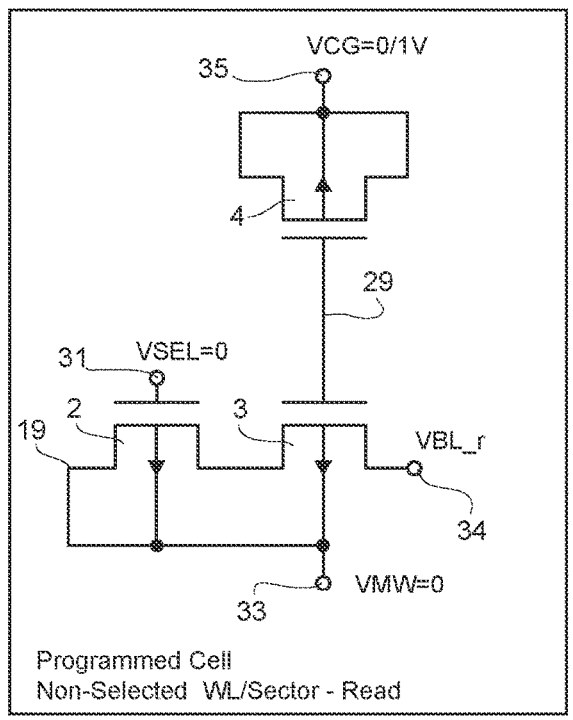

FIG. 5F shows the behavior of a programmed memory cell 1 belonging to non-selected sector and to selected bitline BL.

Also, here, both selection transistor 2 and storage transistor 3 are off and no current flows through memory cell 1.

Summarizing, reading of a selected memory cell 1 is done by:
- biasing the second well 12 at high voltage (reading control gate biasing voltage VCG_r) through the second well contact region 25;
- biasing the selected wordline (first well 11) to low voltage through the first well contact region 18;
- turning on the selection transistor 2 of the selected memory cell 1 by applying a medium selection voltage VSEL_r at the selection terminal 31; and
- biasing the storage transistor 3 of the selected memory cell 1 to a reading condition (by applying a reading voltage VBL_r to drain contact 34 through the bitline BL and by biasing the floating gate 29 at a reading voltage, due to the capacitive coupling to the reading control gate biasing voltage VCG_r through the capacitor transistor 4).

Non selected memory cells 1 in the same wordline WL and same sector are kept off by applying a low selection voltage VSEL and/or a low bitline voltage VBL.

Non selected memory cells 1 in a non-selected wordline WL and same sector are kept off by applying a low selection voltage VSEL and/or a low bitline voltage VBL.

Non selected memory cells 1 in non-selected sectors are kept off also by the low control gate biasing voltage VCG.

Programming

Figure 6A:
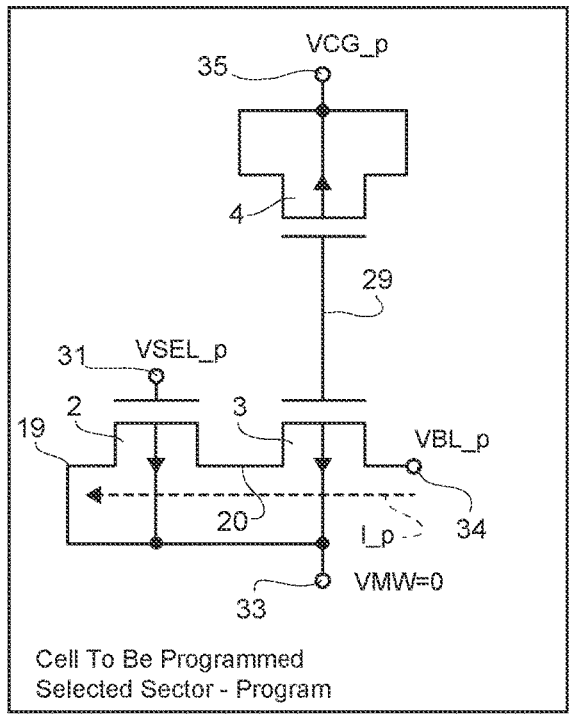
FIGS. 6A-6F show the electric equivalent of the memory cell of FIG. 2 during a program operation, depending on its coupling to selected/non-selected biasing lines.

FIG. 6A shows the behavior of a memory cell 1, selected to be programmed. Programming is done here at the storage transistor 3, using the Channel Hot Electron Injection (CHEI) effect, by applying a voltage drop between drain and source regions of the storage transistor 3 (that is between the second and third conduction regions 20, 21, FIG. 2), thereby generating a programming current I_p. In addition, a high electrical field is generated at the second channel portion 23. Due to the high electrical field, some electrons of the programming current are accelerated a high energy, cross the overlying gate oxide region 30 and are injected into the floating gate 29, where they are trapped.

To this end, and with reference to FIG. 6A, selection transistor 2 is switched on, by biasing selection terminal 31 at a selection program voltage VSEL_p (for example, VSEL_p=4V) and the first well terminal 33 at low voltage LV, e.g., to ground voltage (VMW=0 V), thereby grounding the first well contact region 18 and the first conduction region 19 (FIG. 2) and maintaining the second conduction region 20 at a low voltage; in addition, the selected bitline BL (and thus drain contact 34) is biased at a bitline program voltage VBL_p (for example, VBL_p=4 V).

Furthermore, second well terminal 35 is biased at a control gate program voltage VCG_p, higher than the selection and bitline program voltages VSEL_p, VBL_p (for example, VCG_p=7-9 V).

By virtue of the coupling between the storage transistor 3 and the control gate regions 26 (FIG. 2), a high electric field exists at the second channel portion 23 (FIG. 2), causing injection of charges into programming portion 29A of floating gate 29 and programming of the selected memory cell 1.

Figure 6B:
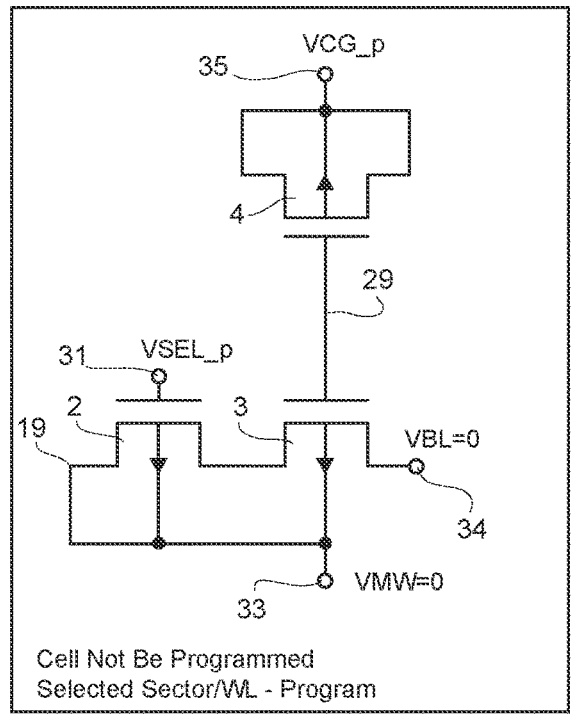

FIG. 6B shows the behavior of a memory cell 1, not selected to be programmed, belonging to a selected sector and coupled to a selected wordline WL and to a non-selected bitline BL.

Since memory cell 1 of FIG. 6B is in a selected sector 102 and is coupled to a selected wordline WL, second well terminal 35 is biased at control gate program voltage VCG=VCG_p and selection terminal 31 is at the selection program voltage VSEL_p. In addition, the first well terminal 33 is biased to low voltage LV, for example VMW=0 V. Since memory cell 1 of FIG. 6B is non-selected for programming, its drain terminal 34 is at low voltage. For example, VBL=0 V.

Therefore, no current is generated between terminals 34, 33 and memory cell 1 of FIG. 6B is not programmed.

Figure 6C:
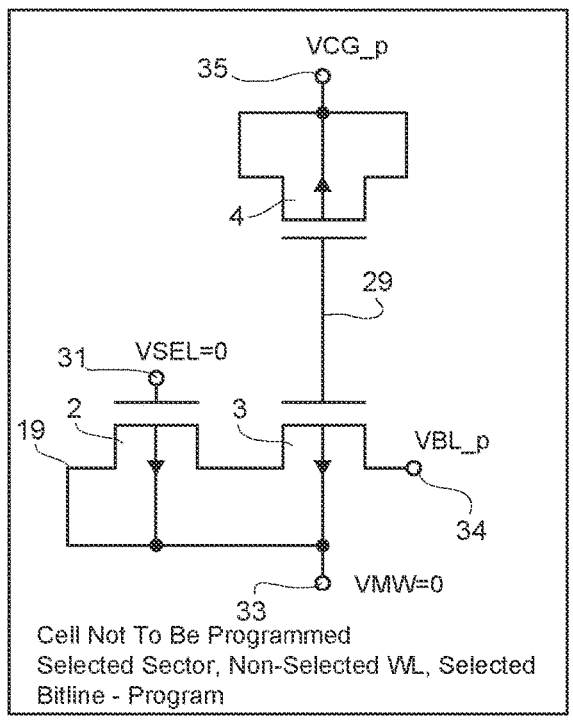

FIG. 6C shows the behavior of a memory cell 1, not selected to be programmed, belonging to a selected sector and coupled to a non-selected wordline WL and to the selected bitline BL.

Since memory cell 1 of FIG. 6C is in a selected sector 102, second well terminal 35 is biased at a control gate program voltage VCG=VCG_p; moreover, since memory cell 1 of FIG. 6B is coupled to the selected bitline BL, drain contact 34 is biased at the bitline program voltage VBL_p (for example, VBL_p=4 V). In addition, selection terminal 31 is at a low voltage, for example VSEL=0V, and first well terminal 33 is biased to low voltage, for example VMW=0 V.

Therefore, selection transistor 2 of the memory cell 1 of FIG. 6B is off and no programming current may flow therethrough.

Figure 6D:
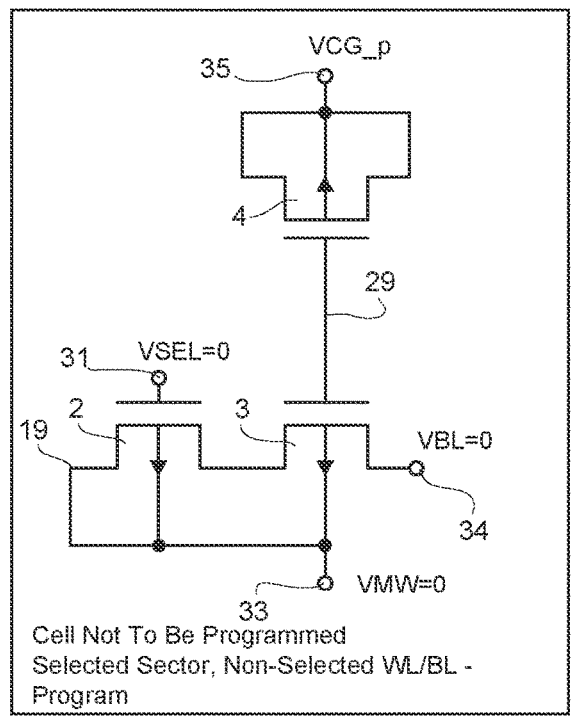

FIG. 6D shows the behavior of a memory cell 1, not selected to be programmed, belonging to a selected sector and coupled to a non-selected wordline WL and to a non-selected bitline BL.

Here, second well terminal 35 is biased at the control gate program voltage VCG_p; drain contact 34 is at low voltage (for example, VBL=0 V); selection terminal 31 is at a low voltage (for example VSEL=0V); and first well terminal 33 is also biased to low voltage LV (for example VMW=0 V).

Therefore, selection transistor 2 of memory cell 1 of FIG. 6B is off and no programming current may flow therethrough.

Figure 6E:
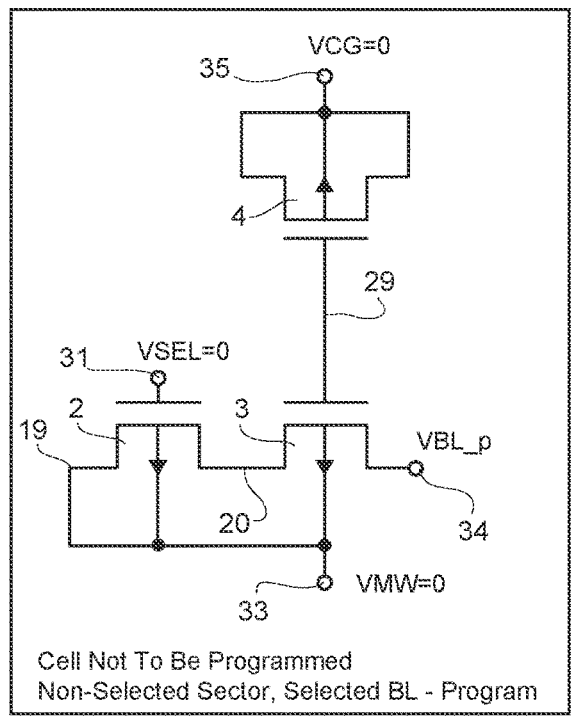

FIG. 6E shows the behavior of a memory cell 1, not selected to be programmed, belonging to a non-selected sector (and thus coupled to a non-selected wordline WL), but coupled to a selected bitline BL.

Here, drain contact 34 is biased at the bitline program voltage VBL_p and all the other voltages are low (for example VCG at second well terminal 35 is 0-1 V; VSEL at selection terminal 31 is 0V; and VMW at first well terminal 33 is 0 V).

Therefore, selection transistor 2 of memory cell 1 of FIG. 6B is off and no programming current may flow therethrough.

Figure 6F:
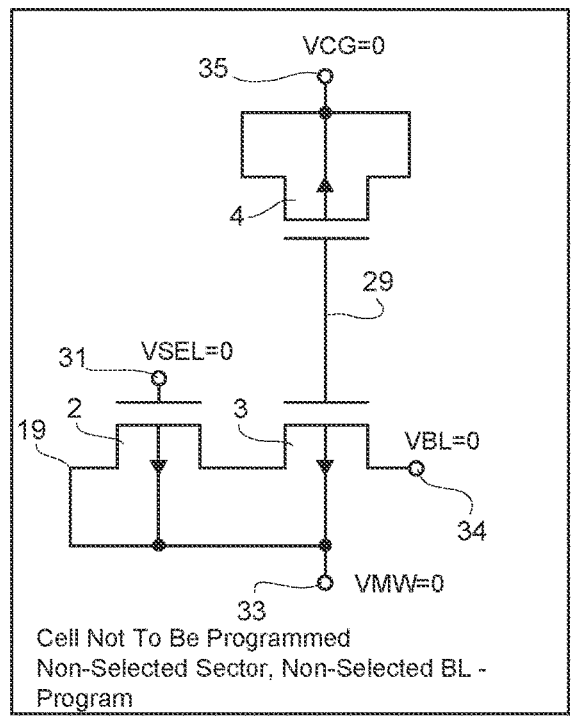

FIG. 6F shows the behavior of a memory cell 1, not selected to be programmed, belonging to a non-selected sector (and thus coupled to a non-selected wordline WL), and coupled to a non-selected bitline BL.

Here, all terminals are at a low voltage, for example VCG=0-1 V, VBL=0 V, VSEL=0V and VMW=0 V.

Therefore, memory cell 1 of FIG. 6F is off and no programming current may flow through memory cell 1 of FIG. 6F.

Summarizing, programming of a selected memory cell 1 is done by:
- turning on the selection transistor 2 of the selected memory cell 1;
- bringing the storage transistor 3 of the selected memory cell 1 in a high current conduction condition; and
- generating a high electric field at the storage transistor 3.

Turning on the selection transistor 2 comprises applying a program selection voltage VSEL_p at the selection terminal 31.

Bringing the storage transistor 3 of the selected memory cell 1 to a high current conduction condition is obtained by applying a first voltage to the first conduction region and applying a second voltage VBL_p, higher than the first voltage, to the third conduction region 21.

Generating a high electric field at the storage transistor 3 comprises applying a third voltage, higher than the first and second voltages, to the control gate region 26, thereby generating a programming electric field at the second channel portion 23 of storage transistor 3 and injection of electrons into the floating gate 29.

Non-selected memory cells 1 in the same sector are kept off by applying a low selection voltage VSEL and/or a low bitline voltage VBL.

Non-selected memory cells 1 in non-selected sectors are kept off also by a low control gate biasing voltage VCG.

As clear to the person skilled in the art, programming through the CHEI effect may be less efficient than using the Fowler-Nordheim effect used in other single-poly memory cells, due to the high currents involved and a possible consequent reduction of memory cells 1 that may be programmed in parallel. In addition, it may require a longer time with respect to Fowler-Nordheim in case of memories of large dimensions. However, as discussed in detail below, a very high reduction in the memory cell area and in the circuitry may be obtained, as discussed below.

Erasing

Figure 7A:
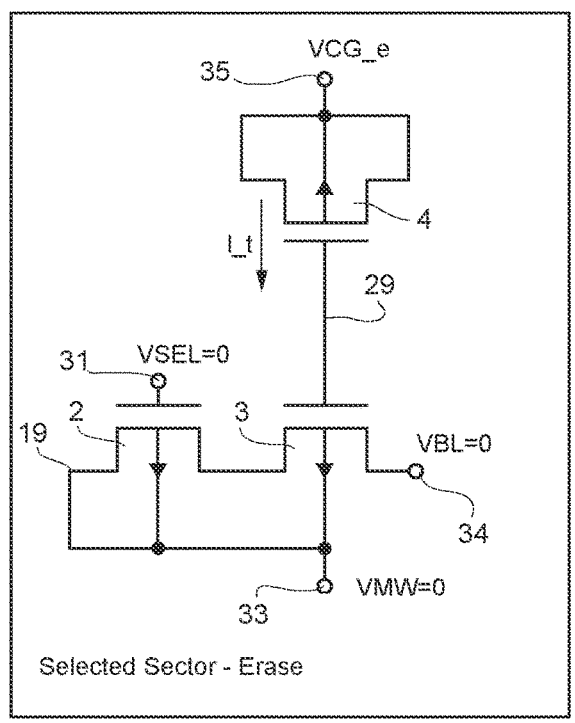
FIGS. 7A and 7B show the electric equivalent of the memory cell of FIG. 2 belonging to a selected/non-selected sector, during an erase operation.

FIG. 7A shows the behavior of a memory cell 1, belonging to a sector 102 selected to be erased. As indicated above, erase is done here at sector level, that is for all the memory cells 1 belonging to a selected sector 102 (sharing the same second well 12 of FIGS. 2 and 3). Here, erase exploits the Fowler-Nordheim effect, and is done by applying a high inverse tunnel voltage between the floating gate 29 and the second well 12 (FIG. 2), thereby causing extraction of electric charges from the floating gate region 29 through the gate oxide regions 30 of the capacitor transistors 4.

To this end, and with reference to FIG. 7A, the first well terminal 33 (and thus the first well 11), the selection terminal 31 and the bitline terminal 34 (through the bitline BL) are biased to low voltage, for example ground (VMW, VSEL, VBL=0V). Second well terminal 35 is biased at a high control gate erase voltage VCG_e, for example, at 16 V.

As indicated above, due to the different extension (area) of the programming portion 29A and the control gate portion 29C of the floating gate region 29, most of the erase voltage VCG_e is applied between the control gate portion 29C of the floating gate 29 and control gate regions 26 (across capacitors 38) and causes extraction of electrons, attracted to the control gate regions 26) by tunneling.

Figure 7B:
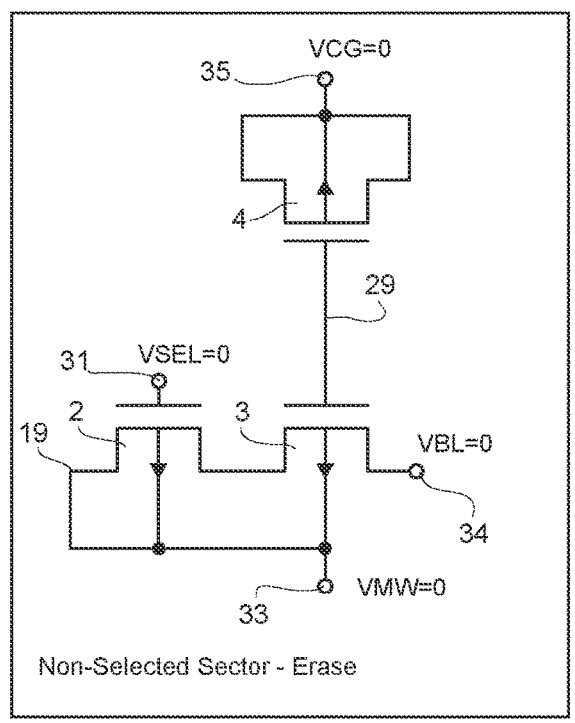

FIG. 7B shows the behavior of a memory cell 1, belonging to a non-selected sector 102 and thus not selected to be erased. Memory cell 1 has all terminals (selection terminal 31, bitline terminal 34, first well terminal 33 and second well terminal 35) biased to low voltage LV, for example ground (VSEL, BL, VMW, VCG=0V).

Thus, memory cell 1 belonging to a non-selected sector 102 is not affected by the erase operation.

Summarizing, erasing of a sector is done by generating a high erasing voltage drop between the floating gate 29 and the control gate terminal(s) 26 of the selected sector.

A low voltage is applied to all the other terminals of the selected sector.

A low voltage is applied also to the second well 12 of all the other sectors.

Therefore, in all operations (reading, programming and erasing) the first well 11 (P-well) of a selected sector 102 is at a lower voltage with respect to the second well 12 (N-well); therefore, second parasitic diode 41 (FIG. 4) is reverse-biased.

In addition, in all operations, the N-well structure 44 (comprising second well 12, bottom isolation layer 16 and well isolating wall 14) of a selected sector 102 is at a higher voltage than the substrate 15 (and substrate well 13); therefore, the first parasitic diode 40 (FIG. 4) is reverse-biased.

Figure 8:
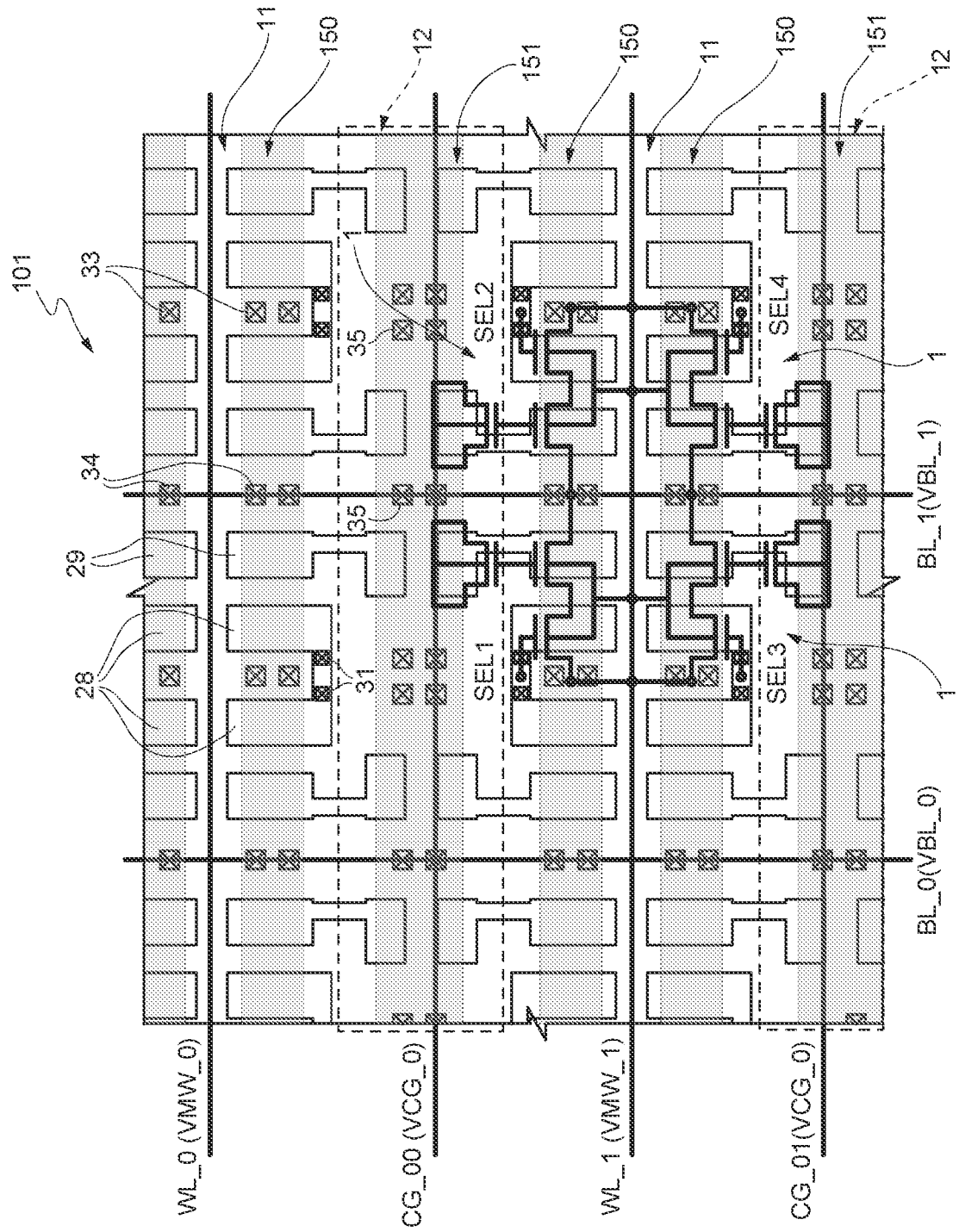
FIG. 8 shows a possible layout of a portion of the memory array of FIG. 1.

FIGS. 8 and 9 shows an exemplary, simplified layout of a portion of memory array 105 of FIG. 2.

Specifically, FIG. 8 shows the layout of a portion of a sector 102, comprising a portion of two first wells 11, coupled to two wordlines WL_0, WL_1 (biased at a respective first well biasing voltage VMW_0 and VMW_1) and two portions of second well 12, coupled to two control gate lines CG_00, CG_01 (coupled to each other and thus biased at a same control gate voltage VCG_0).

FIG. 8 also shows portions of two bitlines BL_0, BL_1 (biased at respective bitline biasing voltages VBL_0 and VBL_1). In addition, FIG. 8 shows the electric equivalent of four adjacent memory cells 1, overlaid to the respective regions, as shown in FIG. 2.

In FIG. 8, active areas 150 (in light grey) and 151 are shown, determining the extension of regions 18-21, as clear to the person skilled in the art.

FIG. 9 shows the electric scheme of a larger portion of a sector 102 (identified as SECT_0), including wordlines WL_0, WL_1, bitlines BL_0-BL_4, and three control gate lines CG (identified as CG_00, CG_01 and CG_02, which share the same biasing, since belonging to the same sector SECT_0, as discussed in detail before).

Memory cell 1 of FIGS. 2-4 has much smaller area than prior art memory cells (FN2 cells disclosed in U.S. Patent Application No. 2011/0157977 discussed above), with an area gain up to about 50% of even optimized versions of the prior art solution (and about 66% of standard versions). In fact, since the first well 11 is always biased at low voltage, lower than the second well 12, no insulation is needed between the first well 11 and the second well 12.

In addition, since programming is done through the CHEI effect, by applying a high voltage only to the second well 12 and a medium voltage at the storage transistor 3, the capacitor transistor 4 may have reduced dimensions. In fact, in this phase, the capacitive coupling at the capacitor transistor 4 has just the aim to create the electric field for energizing the electrical charges flowing in the storage transistor 3; thus, no big area of the capacitor portion 29C of the floating gate 29 is needed. This allows a conspicuous reduction in the dimensions of the floating gate 29, that may have an area of about one sixth of a standard FN2 cell and about one fourth of an optimized FN2 cell.

A considerable reduction of area is also obtainable at circuitry level in the non-volatile memory device 100. In fact, with the standard FN2 cell, each row of the memory array 105 has a triple cascade structure including three high-side drive transistors and three low-side drive transistor, accommodated in own wells, for each wordline, to withstand the high erasing voltage (for example, 13-15 V), applied in the standard solution at the P-wells.

On the contrary, the instant non-volatile memory device 100 may make it with a single triple cascade structure for each control gate line CG, while the first wells 11 are always grounded, thereby causing a considerable reduction of area.

Therefore, the non-volatile memory device 100 may be usefully employed in applications where dimensions are very important, for example in wearable devices, and where programming may be done when the non-volatile memory device 100 is coupled to an external supply.

Figure 10:
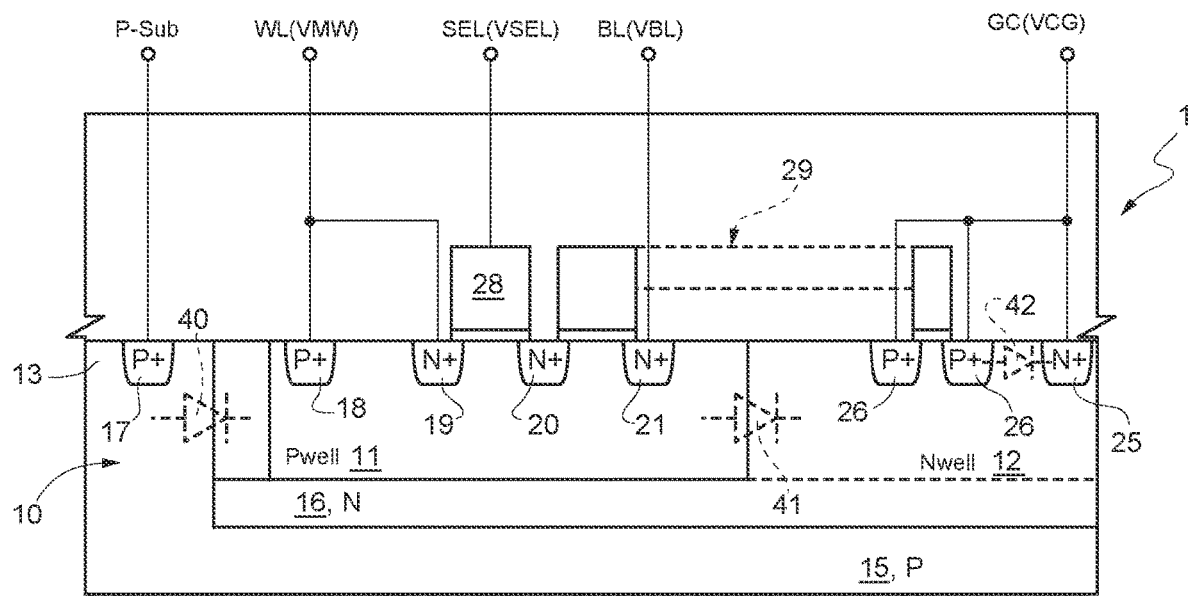
FIG. 10 is a simplified cross-section of a different embodiment of a memory cell of the non-volatile memory device of FIG. 1.

FIGS. 10 and 11 show a different embodiment of memory cell 1, wherein the control gate regions 26 are of opposite type (here, P-type) with respect to second well 12 (here, N-type).

Thus, control gate regions 26 form third parasitic diodes 42 with second well contact region 25, as also shown in the electric diagram of FIG. 10.

For the rest, memory cell 1 of FIGS. 10, 11 corresponds to memory cell 1 of FIGS. 2-4 and operates in the same way described above with reference to FIGS. 5A-7B.

Figure 12:
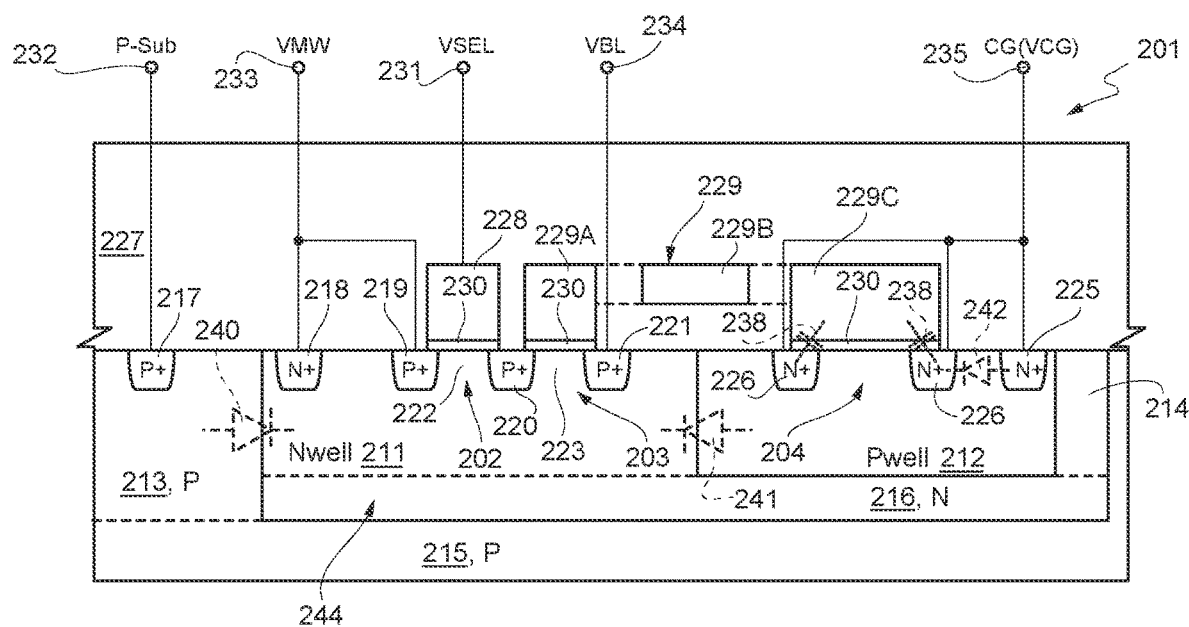
FIG. 12 is a simplified cross-section of another embodiment of a memory cell of the non-volatile memory device of FIG. 1.
Figure 13:
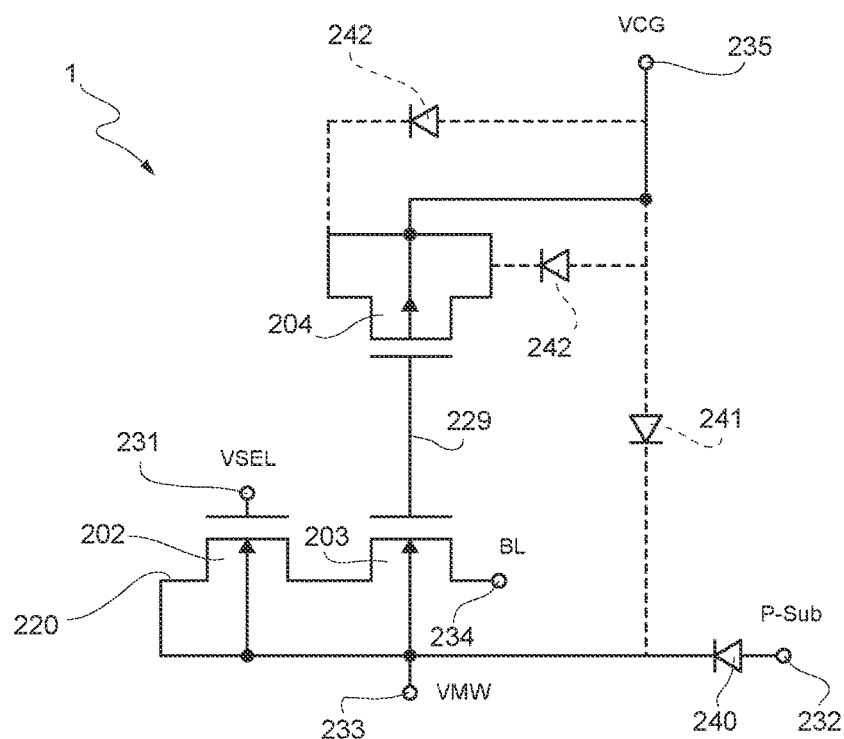
FIG. 13 shows an electric equivalent of the memory cell of FIG. 12.

FIGS. 12 and 13 show another embodiment of memory cell, wherein the first and the second wells have opposite conductivity types, selection and storage transistors are of PMOS type and capacitor transistor is of NMOS type. In addition, both programming and erasing are performed at the storage transistor.

In detail, in FIGS. 12 and 13, where regions similar to the embodiment of FIGS. 2-4 are indicated by reference numbers increased by 200, the first well 211 (accommodating selection and storage transistors 202, 203) is of N type, second well 212 (accommodating capacitor transistor 204) is of P type; first, second and third conduction regions 219-221 and second well contact region 225 are P+-type; first well contact region 218 and control gate regions 226 are of N+-type.

Here, substrate 215, substrate well 213, bottom isolation layer 216, and well isolating wall 214 have the same conductivity as in FIGS. 2-4; gate regions 228, 229 are similar to gates regions 28, 29 of FIGS. 2-4, except that control gate portion 229C of floating gate 229 has a bigger area than control gate portion 29C of FIGS. 2-4, for the reasons indicated below.

Here, the second wells 212 define the sectors of the array (a sector is defined by multiple second wells 212 (P-wells) which are driven/shorted together by the row decoder 125 of FIG. 1).

In addition, first parasitic diode 240 (between substrate 215 and N-well structure 244) is the same as first parasitic diode 40 of FIGS. 2-4; second parasitic diode 241 (between N-well structure 244 and the second well 212) is reversed, with its anode formed by the second well 212 and its cathode formed by N-well structure 244; third parasitic diode 242 (between second well contact region 225 and control gate regions 226) is also reversed with respect to FIGS. 10-11.

Memory cell 201 may be read by applying a high first well biasing voltage VMW (through the first well terminal 233) to the first well 211 and to the first conduction region 219 (e.g., VMW=5V); a lower voltage to the selected bitline BL (e.g., BL=4 V); and a still lower voltage on selection terminal 231 (e.g., VSEL=2.6 V).

Second well 212 is maintained at a low voltage, for example VCG=0 V.

In such a biasing condition, if the memory cell 201 is erased (and thus has a low threshold voltage) the storage transistor 203 is on and conducts current, while if memory cell 201 is programmed (and thus has a high threshold voltage) the storage transistor 203 is off and does not conduct current.

The non-selected memory cells 201 in the selected sector (in the same second well 212) coupled to the selected wordline (same selection line SEL) and to a non-selected bitline BL are kept off by applying a high voltage to the non-selected bitline (e.g., BL=5 V).

The non-selected memory cells 201 in the selected sector coupled to a non-selected wordline WL and to the non-selected bitline BL are kept off by applying a high voltage to the non-selected bitline (e.g., BL=5 V) and a high voltage on the selection line SEL (e.g., VSEL=5 V).

The non-selected memory cells 201 in a non-selected sector are kept off by applying a high voltage to the second well 212, in addition to the first well 211 and to the selection lines SEL. The selected bitlines are biased to the above indicated voltage (e.g., BL=4 V), but the memory cells 201 coupled thereto in the non-selected sectors are off, by virtue of the high voltage of all the other regions.

Programming is performed also here at the single cell level, by applying a high voltage to first well 211 (and thus to the first conduction region 219, e.g., VMW_p=3-5 V), and a low voltage to the selected bitline BL and selection line SEL (e.g., VBL, VSEL=0 V), thereby, turning on the selected memory cell 201.

Second well 212 is maintained at a low voltage, for example VCG=0 V. Due to the capacitive ratio at the storage transistor 203 and the capacitor transistor 204, most of the voltage difference between the first and the second well 211, 212 falls on the storage transistor 203. The storage transistor 203 is thus on and a high electrical field establishes at the programming portion 229A of the floating gate 229.

Thus, a high programming current flows between the second conduction region 220 and the third conduction region 221 and is accelerated by the high field in the second channel portion 223, causing injection of charges into the floating gate 229 and thus programming, analogously to what described above for FIGS. 2-4.

Memory cells 201 coupled to the selected wordline (in the same second well 212) but to a non-selected bitline BL are biased at their bitline terminal 234 to a high voltage, for example VBL=3-5 V. Thus, these memory cells are off, no current flows and no programming occurs.

Memory cells 201 belonging to the selected sector (in the same second well 212) and coupled to a non-selected wordline (different selection lines SEL) are biased at their selection terminal 231 to a high voltage, for example VSEL=3-5 V. They are thus off, independently from the biasing at their bitline terminal 234 (VBL=0V or high voltage, depending on their coupling or not to a selected bitline BL). These memory cells have their second well 212 biased at low voltage, e.g., VCG=0 V.

Memory cells 201 belonging to a non-selected sector (different second well 212) have both their first well 211 and the selection gate region 228 biased at high voltage, for example VMW, VSEL=5 V. They also have their second well 212 biased at high voltage, e.g., VCG=5 V; thus, they have a high voltage at their floating gate 229. They are thus off, independently from the biasing at their bitline terminal 234 (VBL=0V or high voltage, depending on their coupling or not to a selected bitline BL).

Summarizing, the memory cell is configured to be programmed by:
- turning on the selection transistor 202 of the selected memory cell 201;
- bringing the storage transistor 203 of the selected memory cell 201 in a high current conduction condition; and
- generating a high electric field at the storage transistor 203.

Turning on the selection transistor 202 comprises applying a low, switching-on voltage to the selection gate region 228.

Bringing the storage transistor 203 of the selected memory cell 201 to a high current conduction condition is obtained by applying a fourth voltage, greater than the switching-on voltage, to the first conduction region 219 and applying a fifth voltage, lower than the fourth voltage, to the third conduction region 221, thereby generating a programming current between the first and the third conduction regions.

Generating a high electric field at the storage transistor 203 comprises applying a sixth voltage, lower than the fourth voltage, to the control gate region 226, thereby generating a programming electric field at the second channel portion 223 of the storage transistor 203 that causes injection of electrons into the floating gate region 229.

Erasing of the memory cells 201 (performed at a sector level) occurs here by the Fowler-Nordheim effect at the storage transistor 203 by biasing the first well 211 of the selected sector (and thus the first conduction regions 219) at a very high voltage, e.g., VMW=10-16 V). The selection lines SEL of the selected sector are biased to a very high voltage as well (for example, VSEL=10-16 V), and the second well 212 is biased at a low voltage (e.g., VCG=0 V) and the bitlines are kept floating.

In the alternative, erasing may be done here by grounding the first well 211 of the selected sector (or keeping it a low voltage) and biasing the second well 212 at a negative voltage.

Due to the high capacitance of the capacitor transistor 204, most of the potential difference between the first and the second wells 211, 212 is concentrated between the programming portion 229A of the floating gate 229 (at lower potential) and the first well 211 (at the higher potential), causing extraction of electrons from the programming portion 229A of the floating gate 229, and erasing.

Non-selected sectors are biased by applying a low voltage to the first and the second wells 211, 212 and to the selection lines SEL (e.g., VMC, VSEL, VGC=0 V), with the bitlines BL floating.

Summarizing, erasing of a selected sector is done by generating a high erasing voltage drop between the programming portion 229A of floating gate 229 and the first well 211 of the selected sector.

A low voltage is applied to all the terminals of the non-selected sectors, except for the bitline terminals 234, which are left floating.

With this solution, the memory array has a larger area with respect to the embodiments of FIGS. 2-4 and 10-11, but the overall area of the memory device is reduced with respect to prior solutions both because no isolation region exists between the opposite wells 211, 212 of each memory cell 201 and because a lower number of isolated driving transistors may be provided at the circuitry level, for similar reasons as explained above.

Finally, it is clear that numerous variations and modifications may be made to the memory cells, memory array and biasing method described and illustrated herein, all falling within the scope of the invention as defined in the attached claims.

For example, in all embodiments, instead of two implanted control gate regions 26, 226, a single implanted region may be provided, for example performing a capacitive implant before forming the gate regions 28, 128; 29, 229. In the alternative, just one of control gate regions 26, 226 may be provided, reducing the area needed to form vias and contacts.

A differential scheme in the memory array 105 may be provided, to store each bit in two complementary cells, for reliability reasons, in a manner known to the person skilled in the art.

What is claimed is:

1. A non-volatile memory cell, comprising:
   a body;
   a first well of a first conductivity type in the body;
   a second well of a second conductivity type in the body, the first and second wells being arranged adjacent and contiguous to each other, wherein the first conductivity type is P-type and the second conductivity type is N-type;
   a first conduction region, a second conduction region and a third conduction region in the first well, the first, second, and third conduction regions being of the second conductivity type;
   a control gate region of the second conductivity type in the second well, the control gate region being a single implanted region;
   a selection gate over the first well forming, together with the first and second conduction regions, a selection transistor; and
   a floating gate region having a programming portion overlying the first well and a capacitive portion overlying the second well, the floating gate region forming, together with the second and third conduction regions, a storage transistor and, together with the control gate region, a capacitive element, wherein the non-volatile memory cell is configured to be programmed by channel hot electron injection effect at the storage transistor.

2. The non-volatile memory cell according to claim 1, wherein the memory cell is configured to be erased by tunneling.

3. The non-volatile memory cell according to claim 1, wherein the single implanted region of the control gate region is formed by a capacitive implant.

4. The non-volatile memory cell according to claim 1, wherein a capacitance between the programming portion of the floating gate region and the first well is greater than a capacitance between the capacitive portion of the floating gate region and the second well.

5. The non-volatile memory cell according to claim 4, wherein the programming portion has an area greater than the capacitive portion of the floating gate region.

6. The non-volatile memory cell according to claim 1, wherein programming is performed at the storage transistor and erasing is performed by tunneling at the capacitive element.

7. A method of operating a non-volatile memory cell comprising a body; a first well of a first conductivity type in the body; a second well of a second conductivity type in the body; the first and second wells being arranged adjacent and contiguous to each other, wherein the first conductivity type is P-type and the second conductivity type is N-type; a first conduction region, a second conduction region, and a third conduction region in the first well, the first, second, and third conduction regions being of the second conductivity type; a control gate region of the second conductivity type in the second well; a selection gate over the first well forming, together with the first and second conduction regions, a selection transistor; a floating gate region having a programming portion overlying the first well and a capacitive portion overlying the second well, the floating gate region forming, together with the second and third conduction regions, a storage transistor and, together with the control gate region, a capacitive element, the method comprising:
a programming phase, comprising:
turning on the selection transistor;
bringing the storage transistor in a programming current conduction condition, and generating a programming electric field at the storage transistor; and
an erasing phase by tunneling at the capacitive element, the erasing phase comprising:
applying a first voltage between 10V and 16V to the control gate region, and
applying a second voltage equal to 0V to the selection gate and to the first conduction region.

8. The method according to claim 7, wherein the method, in the programming phase, further comprises:
turning on the selection transistor comprises applying a program selection voltage at the selection gate;
bringing the storage transistor in the programming current conduction condition comprises:
applying a third voltage, less than the program selection voltage, to the first conduction region, and
applying a fourth voltage, greater than the third voltage, to the third conduction region, thereby generating a programming current between the first and the third conduction regions; and
generating the programming electric field comprises applying a fifth voltage, greater than the third voltage, to the control gate region, thereby generating the programming electric field at the storage transistor and injecting electrons into the floating gate region.

9. The method of claim 8, wherein, in the programming phase, the program selection voltage applied at the selection gate is equal to the fourth voltage applied to the third conduction region.

10. The method of claim 9, wherein, in the programming phase, the program selection voltage and the fourth voltage are equal to 4V, the third voltage applied to the first conduction region is equal to 0V, and the fifth voltage applied to the control gate region is between 7V and 9V.

11. The method of claim 7, wherein, in the erasing phase, a voltage drop between the second well and the floating gate region is greater than a respective voltage drop between the floating gate region and the first well.

12. The method of claim 7, wherein, in the erasing phase, electric charges are extracted from the floating gate region through a gate oxide region of the capacitive element.

13. A method of operating a non-volatile memory cell comprising a body; a first well of a first conductivity type in the body; a second well of a second conductivity type in the body, the first and second wells being arranged adjacent and contiguous to each other, wherein the first conductivity type is P-type and the second conductivity type is N-type; a first conduction region, a second conduction region, and a third conduction region in the first well, the first, second, and third conduction regions being of the second conductivity type; a control gate region of the second conductivity type in the second well; a selection gate over the first well forming, together with the first and second conduction regions, a selection transistor; a floating gate region having a programming portion overlying the first well and a capacitive portion overlying the second well, the floating gate region forming, together with the second and third conduction regions, a storage transistor and, together with the control gate region, a capacitive element, wherein the control gate region is a single implanted region, the method comprising an erasing phase, the erasing phase comprising:
applying a first voltage to the first well, and
applying a second voltage to the second well, the second voltage being greater than the first voltage.

14. The method of claim 13, wherein a capacitance between the programming portion of the floating gate region and the first well is greater than a capacitance between the capacitive portion of the floating gate region and the second well.

15. The method of claim 14, wherein, in the erasing phase, a voltage drop between the second well and the floating gate region is greater than a respective voltage drop between the floating gate region and the first well.

16. The method of claim 14, wherein, in the erasing phase, electric charges are extracted from the floating gate region through a gate oxide region of the capacitive element.

17. The method of claim 13, wherein the erasing phase is performed by tunneling at the capacitive element.

18. The method of claim 17, wherein the erasing phase further comprises:
applying the second voltage to the control gate region; and
applying the first voltage to the selection gate and the first conduction region.

19. The method of claim 18, wherein the second voltage is between 10V and 16V and the first voltage is equal to 0V.

20. The method of claim 13, further comprising a programming phase comprising:
turning on the selection transistor by applying a program selection voltage at the selection gate;
bringing the storage transistor in a programming current conduction condition by applying a third voltage, less than the program selection voltage, to the first conduction region, and by applying a fourth voltage, greater than the third voltage, to the third conduction region, thereby generating a programming current between the first and the third conduction regions; and
generating a programming electric field by applying a fifth voltage, greater than the program selection voltage and the fourth voltage, to the control gate region, thereby generating the programming electric field at the storage transistor and injecting electrons into the floating gate region.

\* \* \* \* \*